(12) United States Patent
Bedworth et al.

(10) Patent No.: US 7,403,941 B2
(45) Date of Patent: Jul. 22, 2008

(54) SYSTEM, METHOD AND TECHNIQUE FOR SEARCHING STRUCTURED DATABASES

(75) Inventors: Mark D. Bedworth, Worcestershire (GB); Gary D Cook, Somerset (GB)

(73) Assignee: Novauris Technologies Ltd. (GB)

( * ) Notice: Subject to any disclaimer, the term of this patent is extended or adjusted under 35 U.S.C. 154(b) by 361 days.

(21) Appl. No.: 11/115,070

(22) Filed: Apr. 25, 2005

(65) Prior Publication Data

US 2006/0004721 A1    Jan. 5, 2006

Related U.S. Application Data

(60) Provisional application No. 60/565,146, filed on Apr. 23, 2004.

(51) Int. Cl.
*G06F 7/00* (2006.01)
(52) U.S. Cl. .................. 707/3; 707/102; 707/104.1; 717/144; 704/256; 382/228
(58) Field of Classification Search .............. 707/1, 707/3, 102, 104.1; 717/144; 704/256; 382/228
See application file for complete search history.

(56) References Cited

U.S. PATENT DOCUMENTS

| 5,261,088 | A | * | 11/1993 | Baird et al. ................. 707/206 |
| 5,528,701 | A | * | 6/1996 | Aref ............................ 382/178 |
| 5,621,859 | A | * | 4/1997 | Schwartz et al. ............ 704/256 |
| 5,768,423 | A | * | 6/1998 | Aref et al. ................... 382/228 |
| 5,799,276 | A | | 8/1998 | Komissarchik et al. |
| 5,950,159 | A | * | 9/1999 | Knill ............................ 704/251 |
| 6,009,439 | A | * | 12/1999 | Shiomi et al. ............. 707/104.1 |
| 6,104,344 | A | * | 8/2000 | Wax et al. .................... 342/378 |
| 6,343,270 | B1 | | 1/2002 | Bahl et al. |
| 6,501,833 | B2 | | 12/2002 | Phillips et al. |
| 6,584,459 | B1 | * | 6/2003 | Chang et al. ................... 707/3 |

(Continued)

FOREIGN PATENT DOCUMENTS

EP    0175503 A1    3/1986

(Continued)

OTHER PUBLICATIONS

Internet page by Paul Black http://web.archive.org/web/20010620044514/http://www.nist.gov/dads/HTML/dynamicprog.html, 2001.*

(Continued)

*Primary Examiner*—Shahid A Alam
*Assistant Examiner*—Phong Nguyen
(74) *Attorney, Agent, or Firm*—Shemwell Mahamedi LLP

(57) ABSTRACT

Searching a database involves creating an access structure including a first tree data structure having a root node and at least one child node. Each child node is associated with match data corresponding to a data value of a field of a database record. Leaf child nodes of the first tree data structure include a link to another tree data structure in the access structure. Leaf child nodes of a further tree data structure include a link to a database record. The tree structures are traversed and scores are computed for the paths traversed that reflect the level of matching between the match pattern data of the nodes in a path and a search request to identify a database record that best matches the request.

17 Claims, 13 Drawing Sheets

U.S. PATENT DOCUMENTS

| | | | |
|---|---|---|---|
| 6,678,675 B1 * | 1/2004 | Rothrock | 707/3 |
| 6,678,692 B1 * | 1/2004 | Hyatt | 707/102 |
| 6,684,185 B1 | 1/2004 | Junqua et al. | |
| 6,744,861 B1 | 6/2004 | Pershan et al. | |
| 6,925,154 B2 * | 8/2005 | Gao et al. | 379/88.03 |
| 2002/0196911 A1 | 12/2002 | Gao et al. | |
| 2003/0069730 A1 | 4/2003 | Vanhilst | |
| 2003/0115289 A1 * | 6/2003 | Chinn et al. | 709/219 |
| 2004/0044638 A1 * | 3/2004 | Wing et al. | 707/1 |

FOREIGN PATENT DOCUMENTS

| | | |
|---|---|---|
| EP | 1083545 A2 | 3/2001 |
| WO | WO2004/086357 A2 | 10/2004 |

OTHER PUBLICATIONS

Riley, Michael D. and Ljolje, Andrej, Automatic Generation of Detailed Pronunciation Lexicons, Automatic Speech and Speaker Recognition: Advanced Topics, 1995, XP-002409248, 17 pages.

* cited by examiner

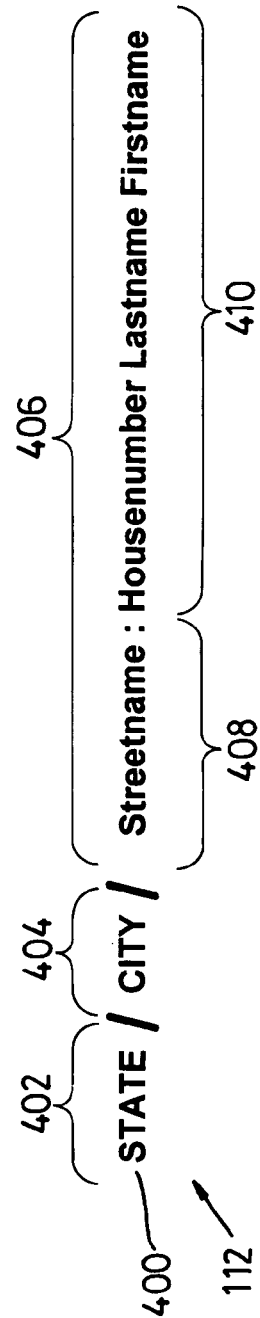

Priority queue

| node | score |
|------|-------|
| 501  | n/a   |

→ best

*Fig. 9A*

Priority queue

| node | score |
|------|-------|
| 502B | -50   |
| 502A | -100  |

→ best
→ pruned

*Fig. 9B*

Priority queue

| node | score |
|------|-------|
| 503E | -20   |
| 503D | -30   |
| 503C | -45   |

→ best
→ pruned

*Fig. 9C*

Priority queue

| node | score |
|------|-------|
| 503D | -30   |

→ pruned

*Fig. 9D*

SYSTEM, METHOD AND TECHNIQUE FOR SEARCHING STRUCTURED DATABASES

PRIORITY APPLICATION

This application claims benefit of priority to U.S. Provisional Patent Application 60/565,146, filed Apr. 23, 2004, entitled SEARCHING STRUCTURED DATABASES USING PARTIAL SCORING AND KEYWORD SPOTTING; the aforementioned priority application being incorporated by reference herein in its entirety.

FIELD OF THE INVENTION

The present invention relates to database searching.

BACKGROUND TO THE INVENTION

There are many problems that can arise when attempting to search a database. For example, some databases are so large that they cannot be stored entirely within the internal memory/Random Access Memory of a computer being used to perform the search. This means that the searching process has to select portions of the database to be retrieved from an external store in order to search. As transferring data from an external store to the internal memory will normally take more time than retrieving data within the internal memory for processing, frequently accessing data from the external memory can significantly reduce the speed of the overall searching process. It is therefore beneficial to reduce the amount of data transferred from external storage during a searching operation, ideally by only retrieving the data that is relevant to the current search.

Another problem that can arise is that at least part of the search request to be processed may not exactly match data that is stored in the database. For example, when the search request data is based on human speech then natural variations between different users' pronunciation of search terms can make it difficult to match the input with database records.

Embodiments of the system described herein are intended to address these problems.
organizedorganizedanalyzin-
gorganizedanalyzinganalyzingorganized

SUMMARY OF THE INVENTION

Embodiments of the invention provide a method or technique for searching and enabling search of a database and records contained in a database.

In an embodiment, a database (or its records contained therein) may be configured, organized or structured so to include one or more tree data structures, where each tree structure includes a root node and at least one child node. Each child node may be associated with match data that corresponds to a data value of a field of a database record. The leaf child nodes of the first tree data structure may also include a link to another tree data structure. In an embodiment, a first tree data structure is traversed until at least one path is identified between its root node and at least one of its said leaf child nodes. Each path may be associated with a score reflecting a level of matching between the search request and the match data of the nodes in the path. Additional tree data structures identified by the link of the leaf node in the path of the previous tree data structure may also be traversed. The traversal of the additional tree structure may identify at least one path between its root node and at least one of its leaf child nodes, where the at least one path is associated with a score reflecting a level of matching between the search request and the match data of the nodes in the path. Data may be outputted relating to the database record identified by the link of the leaf child node of the paths with the best scores.

Embodiments such as described herein enable the use of a database or its records in search and/or record retrieval applications that are prone to receiving many variations in the manner search or selection criteria is entered. For example, data used in white or yellow page applications (having phone number listings, names, addresses etc.) may be interfaced with phonetic recognisers to enable a user to request name and address information by pronouncing a name or other identifier. It is often the case that people will use different identifier information (e.g. name or address) and possibly different sequences of presenting the identifier information. One or more embodiments described herein enable the robust searching of database records in response to input that is inconsistent in form, sequence, completeness etc. In the context of phonetic recognition of address/information, such a database is more likely to return a reliable result in the presence of the various conventions and inputs that may be used by numerous users seeking such database records.

The match data of a said child node of the first tree data structure may correspond to a said data value of a said record of a first set of said database records and/or the match data of a said child node of a said further tree data structure may correspond to a said data value of a said record of another set of said database records.

The at least one child node of the first tree data structure may correspond to at least one different data value of a first common field, the first common field being a field amongst the fields of at least some of the database records having a least number of different data values. The match data of a said child node of the first tree data structure may correspond to a data value of the first common field.

The at least one child node of a said further tree data structure may correspond to at least one different data value of a further common field, a said further common field being selected from amongst the fields of at least some of the database records based on a number of different data values the field contains. The match data of a said child node of a said further tree data structure may correspond to a data value of a said further common field.

At least some of the tree data structures created may be stored on a storage medium external to the processing device performing the method and data relating to a said tree data structure may be transferred to the processing device when it is to be traversed.

The traversing of a said tree data structure may include a node determination process may include: (i) checking the data content of a node of the tree data structure, and (ii) if the node contains data identifying another tree data structure (or group of nodes) then performing the traversal on that other tree data structure, or (iii) if the node does not contain data identifying another tree data structure then, for each child node of that node, computing a score based on a match between the search request and the match data associated with the child node.

The traversing of a tree data structure may include: (i) placing the root node of the tree onto a queue data structure; (ii) popping the node from the queue data structure; (iii) performing the node determination process on the popped node, wherein data relating to the node and the score computed for the node is placed on the queue data structure, and (iv) the scores of nodes in the queue are used to determine the selection of a said further tree data structure for the traversal.

In one implementation, the computation of the score may use a Dynamic Programming technique (which may use a confusion matrix) to score the degree of match between the search request and a hypothesis based on the match data of a said path. Data describing a score computed for a portion of a said hypothesis can be stored and retrieved to avoid re-computation of the score.

In one embodiment, a said database record may include fields including data values representing an address and contact details (e.g. a telephone number) associated with the address. The record may further include a field including a data value representing a name associated with the address and/or contact details. The record may further include a field including a data value representing a state and/or a ZIP/postal code. The first common field may be the field representing the state or the ZIP/postal code.

According to another aspect of an embodiment, there is provided an apparatus for programmatically performing steps for searching a database such as described above. Such an apparatus may comprise a first tree creator for creating a first tree data structure having a root node and at least one child node, where each said child node being associated with match data corresponding to a data value of a field of a database record. The leaf child nodes of the first tree data structure may include a link to another tree data structure. A further tree creator may be provided for creating at least one further tree data structure having a root node and at least one child node. The child node may be associated with match data corresponding to a data value of a database record. The leaf child nodes of the further tree data structure include a link to a said database record. A tree traversal mechanism may be implemented for traversing the first tree data structure to find at least one path between its root node and at least one of its said leaf child nodes. Each path may be associated with a score reflecting a level of matching between the search request and the match data of the nodes in the path. A further tree traversal mechanism for traversing at least one of the further tree data structures may be identified by the link of the leaf node of at least one said path. The traversal of the at least one further tree data structure finding at least one path between its root node and at least one of its said leaf child nodes. Each of said paths may be associated with a score reflecting a level of matching between the search request and the match data of the nodes in the path. An output generator may be included with the apparatus for outputting data relating to a said database record identified by the link of the leaf child node of the paths with the best scores.

The apparatus may further include an input converter for converting an input signal based on an audible signal to produce data describing the search request.

The apparatus may further include an output converter for converting the output data relating to the said database record into an audible signal.

The apparatus may further include an interface for receiving an input signal over a network and/or transmitting an output over a network. The network may include, for example, the Internet, and/or one or more public data networks, including cellular networks and Public Switch Telephony Networks (PSTN).

Another embodiment includes a method or technique of analyzing a database comprising a plurality of records. Specifically, an embodiment may provide for analyzing at least some of the records to identify a first field set amongst fields of the records; analyzing at least some of the records to identify at least one further field set amongst the fields; and producing a specification for a first tree data structure and at least one further tree data structure based on the first field set and the at least one further field set identified.

The first field set may be identified as a first common field amongst the fields, the first common field being a field amongst the fields of at least some of the database records having a least number of different data values, and the at least one further field set may be identified as at least one further common field amongst the fields, a said further common field being selected from amongst the fields of the database records based on a number of different data values the field contains.

The method may further include creating a first tree data structure having a root node and at least one child node, the at least one child node corresponding to at least one different data value of the first common field of the specification, each said child node being associated with match data corresponding to its respective data value, wherein leaf said child nodes include a link to another tree data structure; and creating at least one further tree data structure having a root node and at least one child node, the at least one child node of a said further tree data structure corresponding to at least one different data value of a said further common field of the specification, each said child node being associated with match data corresponding to its respective data value of the further common field, wherein leaf child nodes of the further tree data structure include a link to a said database record.

According to another aspect of an embodiment, there is provided a computer program product comprising: a computer usable medium having computer readable program code and computer readable system code embodied on said medium for processing data, said computer program product including: computer program code configured to make the computer execute a procedure to search a database comprising a plurality of records for at least one said record that at least approximately matches a search request. Data values in each of the records are organized in at least one field, the procedure including: creating a first tree data structure having a root node and at least one child node, each said child node being associated with match data corresponding to a data value of a field of a database record, wherein leaf child nodes of the first tree data structure include a link to another tree data structure; and creating at least one further tree data structure having a root node and at least one child node, each said child node being associated with match data corresponding to a data value of a database record, wherein leaf child nodes of the further tree data structure include a link to a said database record; traversing the first tree data structure to find at least one path between its root node and at least one of its said leaf child nodes, each said path being associated with a score reflecting a level of matching between the search request and the match data of the nodes in the path; traversing at least one of the further tree data structures identified by the link of the leaf node of at least one said path, the traversal of the at least one further tree data structure finding at least one path between its root node and at least one of its said leaf child nodes, each said path being associated with a score reflecting a level of matching between the search request and the match data of the nodes in the path, and outputting data relating to a said database record identified by the link of the leaf child node of the paths with the best scores.

According to yet another aspect there is provided method of accessing a database (by voice) by first obtaining a phonetic transcription of the utterance and searching the corresponding database of phonetic transcriptions of the records in a structured way such that the score for many of the poorly matching hypotheses need not be evaluated explicitly.

The phonetic transcription of the utterance may be a lattice of possible transcriptions. The phonetic transcription of the hypothesis may be lattices of their possible transcriptions. An acoustic score can be calculated for each part of the lattice. Pronunciations scores can be associated with each part of the lattice. The search method employed may be best-first-search or A* search. Branch-and-bound may be used to prune poorly scoring hypotheses.

The database of phonetic transcriptions may be stored as an affix network, which may be at the word level. A set of sub-networks that together comprise the whole network can be stored separately on a storage device and read into main memory when needed. Extra records can be added to the database by storing them in a separate sub-network that is searched first. The direction of the network (prefix or suffix) can be selected according to the structure in the database of phonetic transcriptions. The direction of the network for each sub-network can be selected separately according to the structure in the corresponding part of the database of phonetic transcriptions.

The redundancy of information in the hypothesis being evaluated may be exploited in the selection of the structure of the corresponding sub-network. Dynamic programming may be used to score the degree of match between the transcription of the utterance and the hypothesis. Scores for portions of transcriptions of hypotheses which are common can be cached and not re-computed. A bound on the remaining portion of the score may be obtained by taking the best score for each of the tokens in the transcription of the utterance corresponding to the remaining portion. An estimate of the remaining portion of the score can be obtained by multiplying the bound by a certain factor. An estimate of the remaining portion of the score may be obtained by taking a weighted sum of the scores for each of the tokens in the transcription of the utterance corresponding to the remaining portion.

An improved estimate of the remaining portion of the score may be obtained by multiplying the estimate by a certain factor. Hypotheses corresponding to part of the utterance, which have a score bound or score, estimate that is a certain amount worse than the currently best scoring hypothesis that corresponds to the whole utterance may be pruned. Hypotheses corresponding to part of the utterance which have a score bound or score estimate that is a certain amount worse than the currently best scoring hypothesis, whether that hypothesis corresponds to the whole utterance or part of the utterance can be pruned. Hypotheses corresponding to part of the utterance which have a score bound or score estimate that is a certain amount worse than the currently best scoring hypothesis within the sub-network under consideration that corresponds to the whole utterance may be pruned. Hypotheses corresponding to part of the utterance which have a score bound or score estimate that is a certain amount worse than the currently best scoring hypothesis within the sub-network under consideration, whether that hypothesis corresponds to the whole utterance or part of the utterance can be pruned.

The dynamic programming algorithm may be constrained to only consider a subset of the set of all possible alignments between the transcription of the utterance and the transcription o the hypothesis. Alignments may not be permitted for which, at any point in the alignment, the proportion of tokens explained in the transcription of the hypothesis exceeds the proportion of tokens explained in the transcription of the utterance by more than a certain amount. Alignments may not be permitted for which, at any point in the alignment, the proportion of tokens explained in the transcription of the utterance exceeds the proportion of tokens explained in the transcription of the hypothesis by more than a certain amount. Alignments may not be permitted for which the first token in the transcription of the hypothesis is matched against a token in the transcription of the utterance, which is more than a certain number from the beginning. Alignments may not be permitted for which the first token in the transcription of the utterance is matched against a token in the transcription of the hypothesis, which is more than a certain number from the beginning.

The search may be terminated should the time elapsed exceed a certain amount. The best scoring hypothesis that corresponds to the complete utterance may score better than the other hypotheses that correspond to the complete utterance by more than a certain amount. The score for the hypotheses corresponding to the complete utterance, other than the best scoring one, may be approximated by the score of the second best scoring hypothesis.

According to another aspect of the present invention there is provided a computer program product having machine-readable program code recorded thereon for performing phonetic transcription of an utterance and a search of a database of phonetic transcriptions in order that the record corresponding to the closest match, or matches, may be retrieved. The product can be used for accessing a database of addresses. The program product may be used for accessing a database of names and addresses. The product may be used for accessing a database of names and/or personal information. The program product can be used for accessing a database of phrases. The program product can be used for accessing the translation into another language of a database of phrases. The product may be used over the telephone. The product can be used on a personal digital assistant or pocket computer.

One or more embodiments described herein may be implemented through the use of modules or other programmatic mechanisms. A module may include a program, a subroutine, a portion of a program, or a software component or a hardware component capable of performing one or more stated tasks or functions. As used herein, a module can exist on a hardware component such as a server independently of other modules, or a module can be a shared element or process of other modules, programs or machines. A module may reside on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

BRIEF DESCRIPTION OF THE DRAWINGS

The invention may be performed in various ways and, by way of example only, embodiments thereof will now be described, reference being made to the accompanying drawings, in which:

FIG. 3 illustrates schematically some example records of the data;

FIG. 4 illustrates schematically an example of a specification template for the access structure;

FIGS. 9A-9D illustrate schematically the content of queues/lists used by the access structure traversal process;

DETAILED DESCRIPTION OF THE INVENTION

Figure 1:
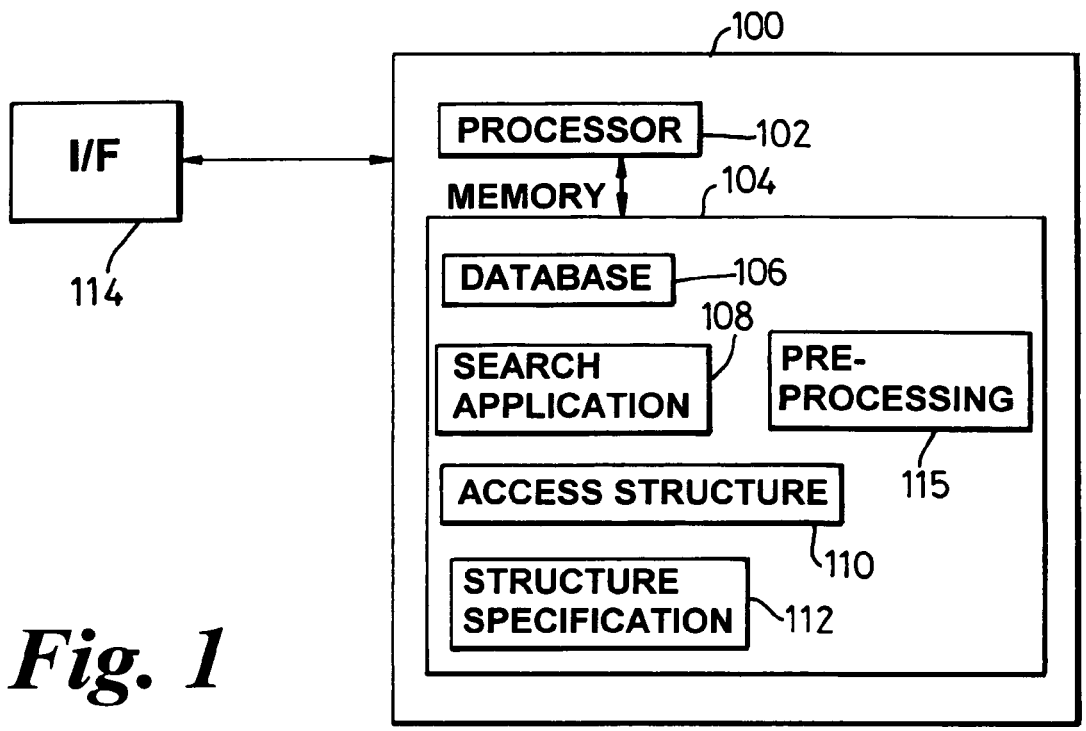
FIG. 1 illustrates schematically a computer system configured to execute an application for searching a database.

In FIG. 1 a computing system 100 includes a processor 102 in communication with a memory 104. It will be appreciated that the computing system can take various forms, such as a computer or a plurality of computers connected over a network. The memory 104 is shown as storing a database 106 and a database searching application 108. The searching application 108 operates by creating a database access structure 110 using structure specification template data 112. It will be apparent to the person skilled in the art that although the data/instructions 106-112 are shown as being contained within memory 104 in FIG. 1, they could be stored on more than one data storage device and the various data structures/software modules could be distributed over a plurality of separate computers. For example, the database searching application 108 can be held in the internal Random Access Memory (RAM) of a computing device during execution, whereas the database 106 may be stored on an external storage device, such as one or more hard drives, with portions of the database being copied into the RAM as required.

The computing system 100 is shown as being connected to an interface device 114. Again, it will be appreciated that the interface device can take one of many forms. For example, it could comprise a display unit and input devices (e.g. keyboards, mouse) connected directly to the processor 102 that executes the database searching application 108, or the interface 114 may be part of a another device that is in communication with the processor 102 over a network.

The main example given below is a database that stores data describing telephone directory information (typically personal name and address details with an associated telephone number). In this case, the interface component 114 may include a conventional mobile or landline telephone device that is connected to a service linked to the computing system 100. The user can connect to the service using the telephone device and, when prompted, speaks the name and address for which the corresponding telephone number is desired into the phone device 114 and this audio signal is converted (either by a pre-processing module 115 within computing system 100, or by another component, e.g. an Analogue to Digital Converter and suitable software within the phone device 114) into symbolic data suitable for comparison with sound tokens associated with the access structure 110. This speech to symbolic data conversion can be performed using existing techniques such as so-called phonetic decoding, using, for instance, Hidden Markov Models as described in published international patent application WO2004/090866 and the "Hidden Markov Model Toolkit (HTK) Book", currently available from the website http://htk.eng.cam.ac.uk.

The symbolic data is used by the database searching application 108 as an input/search request and the application seeks to find the database record corresponding to the request in order to produce output data relating to the desired telephone number. The telephone number data may be converted into a synthesised voice that relays the requested telephone number to the user of the phone device 114.

Figure 2:
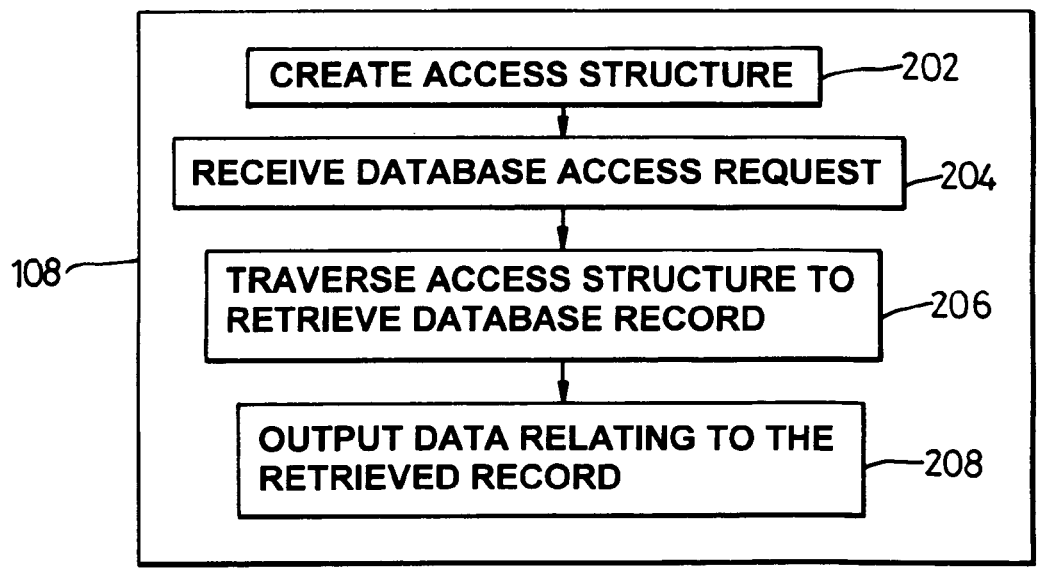
FIG. 2 illustrates schematically an overview of steps performed by the database searching application, including steps of creating a database access structure and traversing the structure to access a particular database record.

FIG. 2 illustrates schematically an overview of the steps performed by the searching application 108. At step 202 the application creates the access structure 110 based on data contained in the database 106 and the structure specification template 112. After the access structure has been built (typically upon invoking the search application 108), it can be used for processing as many database access requests as required. When the database is updated, e.g. when new records are added to it, then another access structure covering the updated/new records may be built that can be used to search in addition to a previously built access structure covering the database in its previous state. A further list of deleted records may also be built and used to edit the hypotheses returned by the search process before outputting information to the user. When convenient, a replacement/new access structure covering the entire database in its updated form can be built.

At step 204 a request to access data from the database is received, e.g. the name and address of a person whose telephone number is desired. As mentioned above, the request can take the form of data representing an utterance processed into sound tokens as in known conventional speech processing algorithms, although it will be understood that other forms of input may be used. The system is particularly suitable for forms of input that may only be able to approximately match data within a database. Other examples include an input based on handwriting, or text produced using a mobile phone keypad as an input device.

At step 206 the searching application 108 traverses the database access structure 110 to attempt to retrieve data relating to the database records that best match the search request and at step 208 data relating to the retrieved data, e.g. the desired telephone number, is output to the user.

Turning to FIG. 3, an example of a database 106 is shown. In the example, the database comprises a set of records 300 arranged as lines in a table, with each record comprising a plurality of fields; however, it will be appreciated that any suitable data structure capable of representing database records can be used. Only a small number of example records are shown for ease of illustration, although it will be appreciated that the system described herein is capable of dealing with large databases (e.g. ones containing hundreds of millions of records, requiring around 10 Gigabytes or more of storage) that are too large to be stored in their entirety within the internal memory (RAM) of a computer.

In the example of FIG. 3 each of the database records 300 represents an address, the name of the owner/occupier of that address, as well as a telephone number associated with the address. The fields of the records 300 in the example include a state field 302; a city field 304; a street address field 306; a house number field 308; a last/family name field 310 a first name field 312 and a telephone number field 314. It will be appreciated that pointers to data may be associated with one or more of the fields rather than the actual data being stored in each field and that fields representing other types of information, e.g. a ZIP/postal code, could be included.

FIG. 4 illustrates an example of a template for an access structure specification 112 for use with the example database of FIG. 3. In the example, the template is shown as a line 400 of symbols/text, although it will be understood that any suitable data structure could be used to represent the specification template. The line 400 is divided into three major groups 402, 404, 406 (separated by the "|" symbol in the example), although any number of major groups could be defined, depending upon the particular database to be searched.

As will be described below in more detail, the access structure 110 comprises a tree-like data structure comprising a hierarchy of node groups, with each node group itself including a hierarchical tree data structure of nodes. Leaf nodes within a group of nodes at the terminal level of the hierarchy will contain links to records in the database. In use, the search application will traverse nodes/node groups of the access structure to attempt to reach a node that contains a link to the database record that best matches the search request. The path of nodes selected for traversal will depend on the level of matching between the input/search request and match pattern data associated with arcs between the nodes/groups of the access structure.

The number of major groups in the structure specification template determines the number of levels of node groups in the hierarchy of the access structure. For instance, as there are three major groups in the structure specification template of FIG. 4, the access structure it defines will have three hierarchical levels of node groups, with the root level node group corresponding to the first major group 402 of the structure specification line 400, the second level node group(s) corresponding to major group 404 and the third/terminal level node group(s) corresponding to major group 406. It should be noted that the specific fields that are recited as being a major group are a matter of implementation and design choice.

In the example, the first major group 402 corresponds to the state field 302 of the database. As will be detailed below, when the access structure is being created, data values from appropriate fields of a record 300 of the database will be substituted into the corresponding fields of the structure specification template to create a current structure specification that is used to create a node/node group within the access structure.

The second major group 404 of the template corresponds to the city field 304 of the database. The third major group 406 is divided into two sub-groups: a first sub-group 408 and a second sub-group 410 (the sub-groups are separated by the ":" symbol in the example). Sub-group 408 corresponds to the street name field 306 of the database, whilst sub-group 410 corresponds to three database fields: house number field 308, last name field 310 and first name field 312. It will be understood that any of the major groups of a structure specification could be divided into a plurality of sub-groups and, in turn, at least one such sub-group may be divided into a further sub-group (e.g. using other separation symbols) and so on to provide further hierarchical levels within the resulting access structure.

An access structure template will be created for each database that is to be used with the searching application. The selection of which fields of the database records to include in the template and how the selected fields should be included as a major group/sub-group in the template will depend upon the structure of the database (either in its entirety, or based upon a sample of the database). Various factors may be taken into account when analyzing the fields to create the template. For instance, a field that contains relatively few different data values amongst the database records can be a good candidate for inclusion as a major group that defines a high level group of nodes in the access structure tree. Having such a node group at a high level in the tree can help to more quickly eliminate nodes that are unlikely to contain relevant match patterns from traversal. How the fields can be used to create nodes/group nodes that improve the efficiency of data transfer from an external storage medium into the internal memory of the computer for processing at the appropriate time may also be taken into account.

For a major group that is not divided into subgroups, the corresponding node group of the resulting access structure will contain a tree having a root node and one lower level of child nodes, the child nodes being at the terminal level of the tree. For a major group that is divided into subgroups, the corresponding node group of the resulting access structure will contain a tree having a root node and the number of levels of child nodes depending from the root will correspond to the number of sub-groups in the major group. For example, the node group corresponding to structure specification major group 406 will contain a tree with a root level node, a second level of nodes corresponding to sub-group 408 and a third/terminal level of nodes corresponding to sub-group 410.

Figure 5:
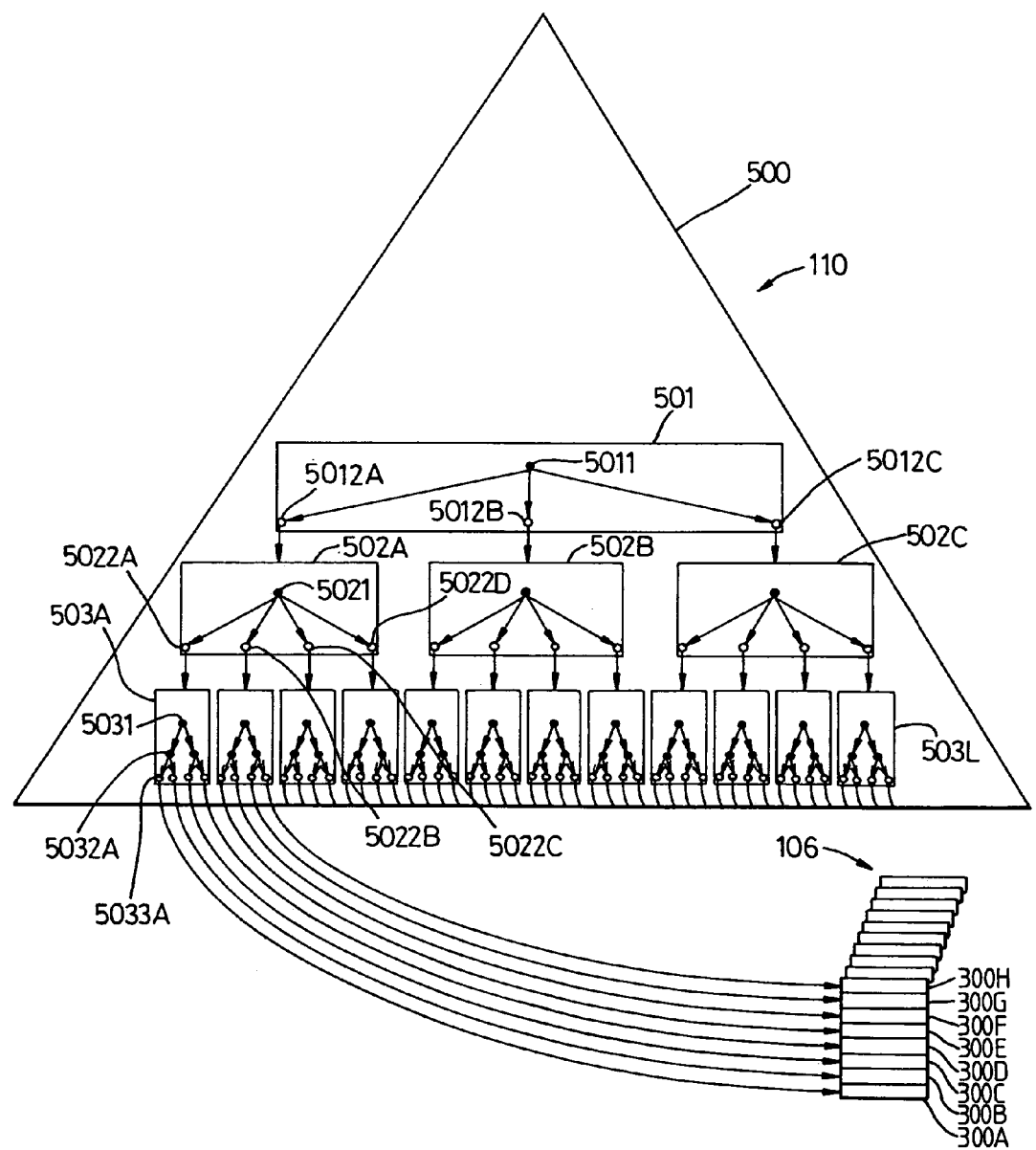
FIG. 5 illustrates schematically an example of an access structure including links to records of the database.

FIG. 5 shows diagrammatically an example of an access structure created using the structure specification 100. Reference numeral 500 identifies a group/tree-like structure (also denoted by the triangular outline) of groups of nodes. Group 500 can be thought of as a trivial tree-like data structure/group with a single node, that node itself containing a hierarchical tree-like structure of groups of nodes 501-503.

Reference numeral 501 identifies a group of nodes (also denoted by the rectangular outline) at the first/highest level of the node groups that is defined by the first major group 402 of the structure specification. Reference numerals starting with 502 identify a second level of node groups within the hierarchy (i.e. children of the root level node group 501). Node groups 502 are defined by the second major group 404 of the structure specification. In the example there are three node groups 502A-502C at this second hierarchical level.

Reference numerals starting with 503 identify a third/terminal level of node groups within the hierarchy (i.e. children of the second level node groups 502). In the example there are twelve node groups 503A-503L at this third level. Node groups 503 are defined by the third major group 406 of the structure specification. Node groups 503 are on the terminal level of the group/tree 500 that contains the node groups 501-503 and hold links to objects outside the group/tree 500.

The nodes within group 501 include a root node 5011. This root node 5011 has three child nodes 5012A, 5012B, 5012C in the example. Nodes 5012 are shown unfilled in the diagram of FIG. 5, denoting that they are on the terminal level of the tree structure of their node group 501 and hold links to objects outside the group 501, namely one of the second level node groups 502.

In the case of terminal level node 5012A of the node group 501, the link is to the second level node group 502A. The root node 5021 of the group 502A has four child nodes, 5022A, 5022B, 5022C, 5022D. Nodes 5022 are again shown unfilled, denoting that they are on the terminal level of the tree structure of their node group 502 and hold links to objects outside the group 502, namely one of the third level node groups 503. A similar set of nodes are contained within the other second level node groups 502B-502C, although these are not detailed for brevity.

The terminal level node 5022A of group 502A contain a link to node group 503A. The root node 5031 of node group 503A has two child nodes 5032A, 5032B at the second level of the tree within the group. Each of the nodes 5032A and 5032B has two child nodes 5033A, 5033B and 5033C, 5033D, respectively, on the third/terminal level of the tree of group 503A. Again, nodes 5033 are shown unfilled, denoting that they are on the terminal level of the tree structure of their node group 503 and hold links to objects outside the group 502, in this case records 300 of the database 106. For example, node 5033A contains a link to record 300A of the database. A similar set of nodes are contained within node groups 503B-503L, although these are not detailed for brevity.

Although the example access structure of FIG. 5 is relatively uniform/symmetrical in appearance, it will be appreciated that the number and arrangement of nodes/node groups can vary depending on the particular database being processed.

Figure 6:
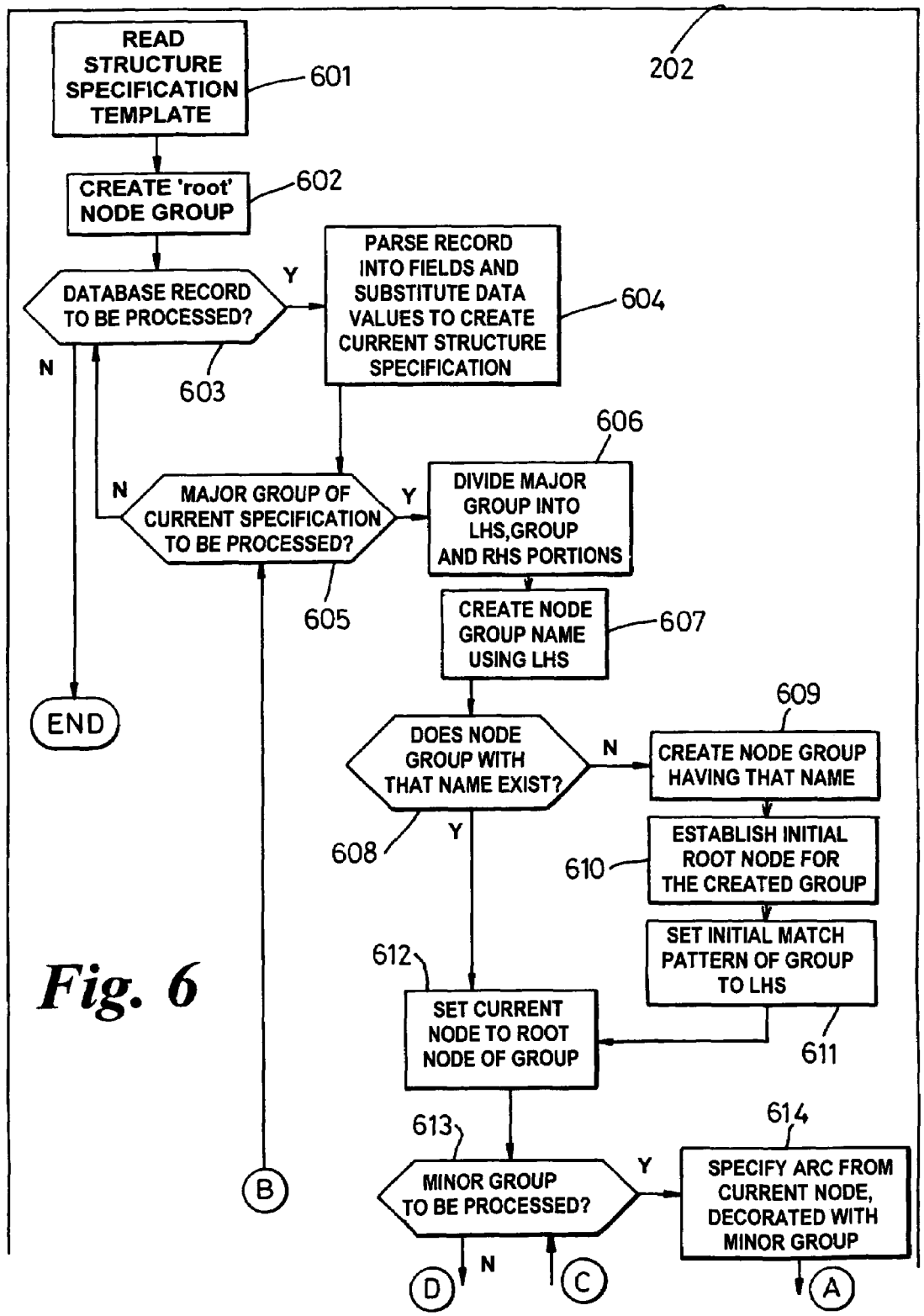
FIG. 6 illustrates schematically steps involved in creating the access structure using the structure specification template and records from the database.
Figure 6:
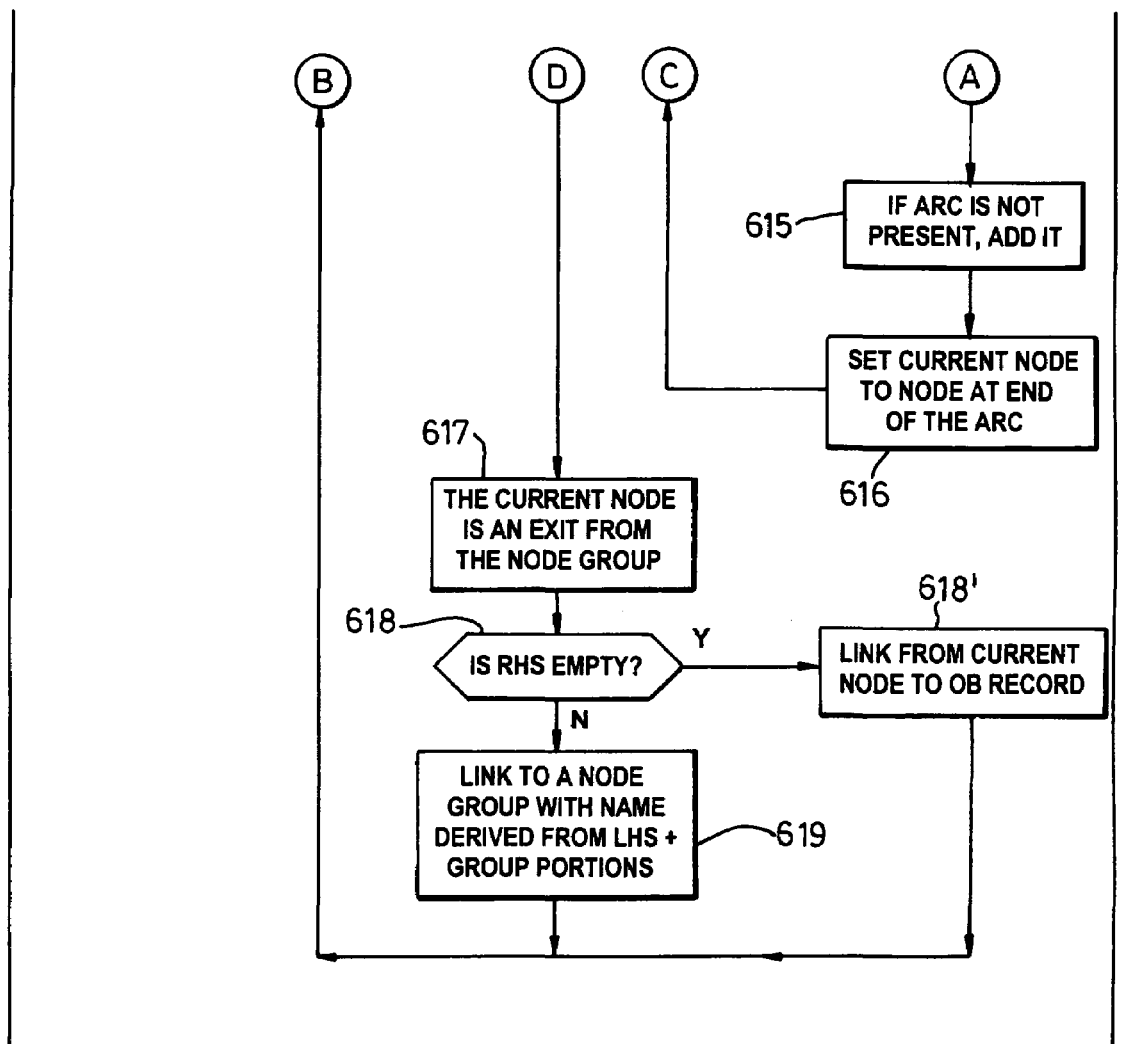

FIG. 6 illustrates an example of steps that is used by the searching application 108 to create (process 202 of FIG. 2) the access structure 100 from data contained in the database 106 and the structure specification template 112. An access structure defines a complete path from the root node group of the structure to leaf nodes of the structure, with each leaf node containing a link to each record in the database. An intention of creating such an access structure is that a path can be found from the root node to a leaf node that contains a link to the database record that best matches the search request. At step 601 the structure specification 112 template is read. At step 602 the root level node group of the access structure is created. This group is named "root". Step 603 is the start of a loop of steps that will be performed for each record 300 in the database. At step 604 the record being processed is parsed into fields and data values corresponding to the relevant field names (i.e. those included in the structure specification template 112) are substituted for the field names in the template to create a current structure specification.

Step 605 is the start of a loop of steps that will be performed for each major group in the current structure specification. At step 606, the current structure specification is divided into three portions: a Left Hand Side (LHS) portion, a Group portion and a Right Hand Side (RHS) portion. The portions are delineated by the "|" symbols included in the current structure specification 112. The LHS portion corresponds to the major group or groups that come(s) before (i.e. located to the left in the specification template) the major group being processed. If the major group is the first one in the structure specification, e.g. corresponding to major group 402 of the template 112, then the LHS portion will be empty. The Group portion corresponds to the major group currently being processed. The RHS corresponds to the major group or groups that come(s) after (i.e. located to the right in the specification) the major group currently being processed. If the major group is the last one in the structure specification, e.g. corresponding to major group 406 of the template, then the RHS portion will be empty.

At step 607 a name for a node/group is created by concatenating the data values in the LHS portion of the current structure specification. If the LHS portion is empty then the name created is "root". At step 608 a question is asked whether a node/group having the name created at step 607 already exists. If the node/group does not exist then at step 609 a node/group for the structure specification is created and given the name produced at step 607. An initial root node for the newly created group is created at step 610. An initial match pattern that is convenient for implementers of the system can be associated with the node group. The initial match pattern of the newly created node/group is set to the value of the LHS portion at step 611, before control is passed on to step 612.

If the question asked at step 608 is answered in the affirmative then control passes on to step 612. At step 612 the current node being processed is set to the root node of the current node group. Step 613 is the first of a loop of steps that will be performed for each sub-group defined within the major group currently being processed. If no sub-groups are defined using the ":" symbol then the major group is treated as the sole sub-group. At step 614 data representing an arc from the current node, decorated with the sub-group, is created. Data corresponding to the name of the sub-group is associated with the arc. This data is intended to be used as a match pattern for comparison with an input and can be used for computing a score relating to the similarity between the match pattern and the input when traversing the tree, as will be described below. In an embodiment where the input data is based on an utterance, the match pattern data may comprise a sound token. At step 615 a question is asked whether such an arc already exists in the access structure and if it does not then the arc is created within the access structure. At step 616 (the last one in the loop starting at step 613) the current node is set to the node at the end of the arc.

At step 617 the current node being processed will be an exit from the node group. At step 618 a question is asked whether the RHS portion is empty. If it is empty then data representing a link from the current node to the corresponding database record (or desired content to be retrieved relating to that record) is created and stored within the current node. If the question asked at step 618 is answered in the negative then at step 619 data representing a link from the current node to a node group having a name derived from a concatenation of the data values of the LHS and Group portions is created and stored within the current node. It will be appreciated that the process described above can be adapted to create further hierarchical tree-like structures of node groups/nodes within a group of nodes.

Figure 7A:
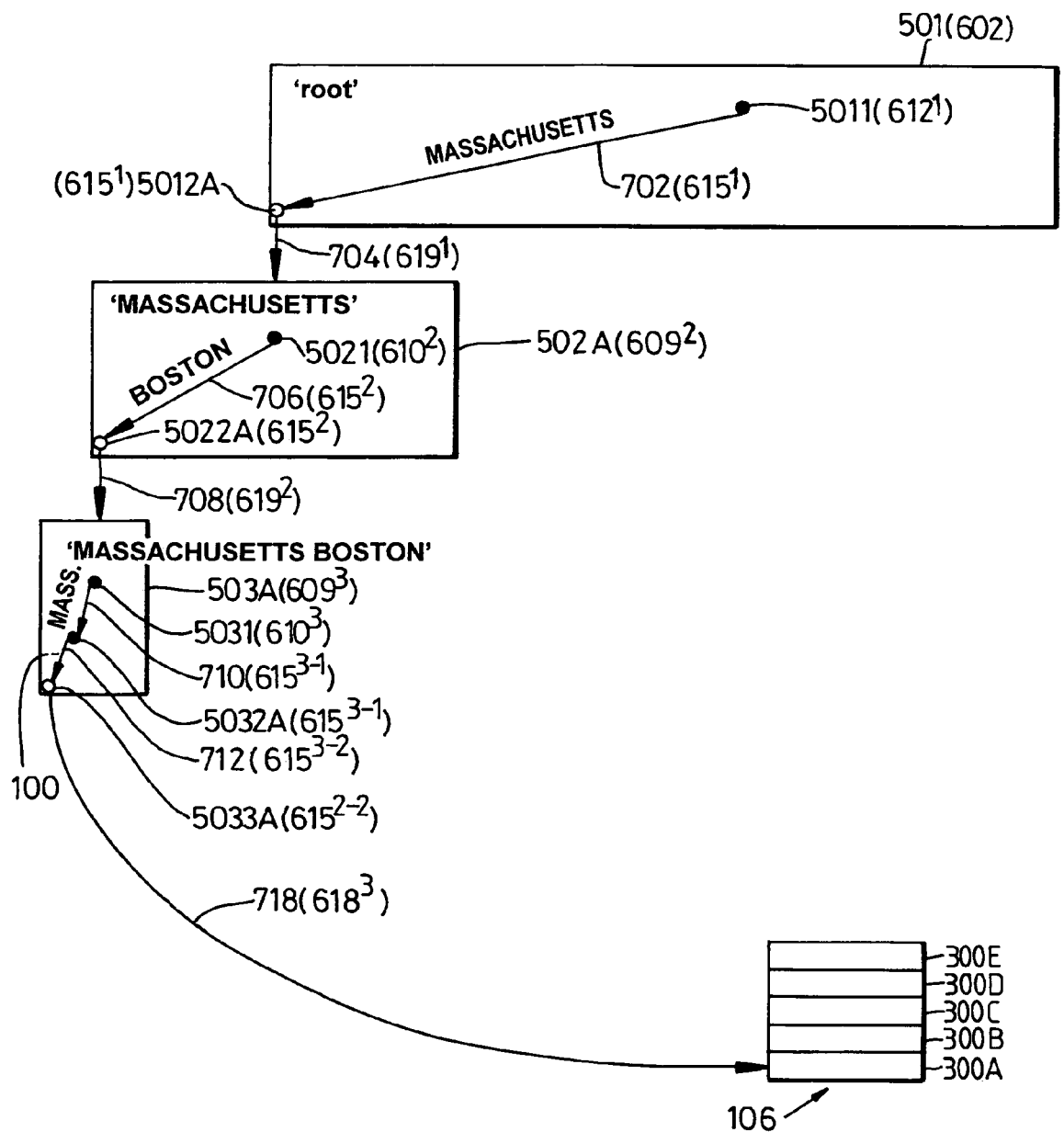
FIGS. 7A and 7B illustrate schematically an example of a partially constructed access structure.

An example of the execution of the process of FIG. 6 will now be given with reference to the partially constructed access structure shown in FIG. 7A. Database record 300A of FIG. 3 is used for the example.

Step:
601 Read structure specification template 112
602 "root" node group 501 created
603 For database record 300A:
    604 The three major groups of the current structure specification are:
        Massachusetts|Boston|Main:100DaviesBrian
    605[1] For "Massachusetts" major group:
        606[1]    LHS=<empty>;    Group=Massachusetts;
          RHS=Boston 607[1] As LHS is empty, name of group is "root"
608[1] Node group named "root" already exists
612[1] Current node set to root node 5011
613[1] For "Massachusetts" group (sole sub-group):
   614[1] Create data representing arc 702 from root node 5011, decorated with "Massachusetts" ("sub-group" being processed)
   615[1] Arc 702 does not already exist and so is added to access structure, along with node 5012A at the end of the arc
   616[1] The current node us set to node 5012A
617[1] Current node 5012A is an exit node of group 501
619[1] RHS is not null (="Boston"), store data representing a link (704) from current node 5012A to a node group named "Massachusetts" (=(empty) LHS+Group) (this node group will be created at step 609[2] below)
605[2] For "Boston" major group:
606[2] LHS=Massachusetts; Group=Boston; RHS=Main:100DaviesBrian
607[2] Name "Massachusetts" constructed for node group (based on LHS)
608[2] Node group named "Massachusetts" does not exist
609[2] Create node group 502A named "Massachusetts"
610[2] Establish initial root node 5021 of group 502A
611[2] Set initial match pattern of group to "Massachusetts"
612[2] Set current node to root node 5021
613[2] For "Boston" group (sole sub-group):
   614[2] Create data representing arc 706 from root node 5021, decorated with "Boston" ("sub-group" being processed)
   615[2] Arc 706 does not already exist and so is added to access structure, along with node 5022A at the end of the arc 706
   616[2] Current node set to node 5022A at end of arc 706
617[2] Current node 5022A is an exit node of group 502A
619[2] RHS is not null (="Main:100DaviesBrian"), store data representing a link (708) from current node 5022A to a node group named "MassachusettsBoston" (=LHS+Group) (this node group will be created at step 609[3] below)
605[3] For "Main:100DaviesBrian" major group:
606[3] LHS=MassachusettsBoston; Group=Main:100DaviesBrian; RHS=<empty>
607[3] Name "MassachusettsBoston" constructed for node group (based on LHS)
608[3] Node group named "MassachusettsBoston" does not exist
609[3] Create node group 503A named "Massachusetts-Boston"
610[3] Establish initial root node 5031 of group 503A
611[3] Set initial match pattern of group to "MassachusettsBoston"
612[3] Set current node to root node 5031
613[3-1] For "Main" sub-group:
   614[3-1] Create data representing arc 710 from root node 5031, decorated with "Main" (sub-group being processed)
   615[3-1] Arc 710 does not already exist and so is added to access structure, along with a node 5032A at the end of the arc 710
   616[3-1] Current node set to node 5032A
613[3-2] For "100DaviesBrian" sub-group:
   614[3-2] Create data representing arc 712 from node 5032A, decorated with "100DaviesBrian" (sub-group being processed)
   615[3-2] Arc 712 does not already exist and so is added to access structure, along with node 5033A at the end of the arc 712
   616[3-2] Current node set to node 5033A
617[3] Current node 5033A is an exit from group 503A
618[3] RHS is empty and so store data representing a link (714) from node 5033A to database record 300A
603 For database record 300B . . .

Thus, the above process has created an access structure with three levels of node groups and a complete path between the root node group 501 and a database record. Normally, process 202 will continue to process all the records 300 of the database to build an access structure.

Figure 7B:
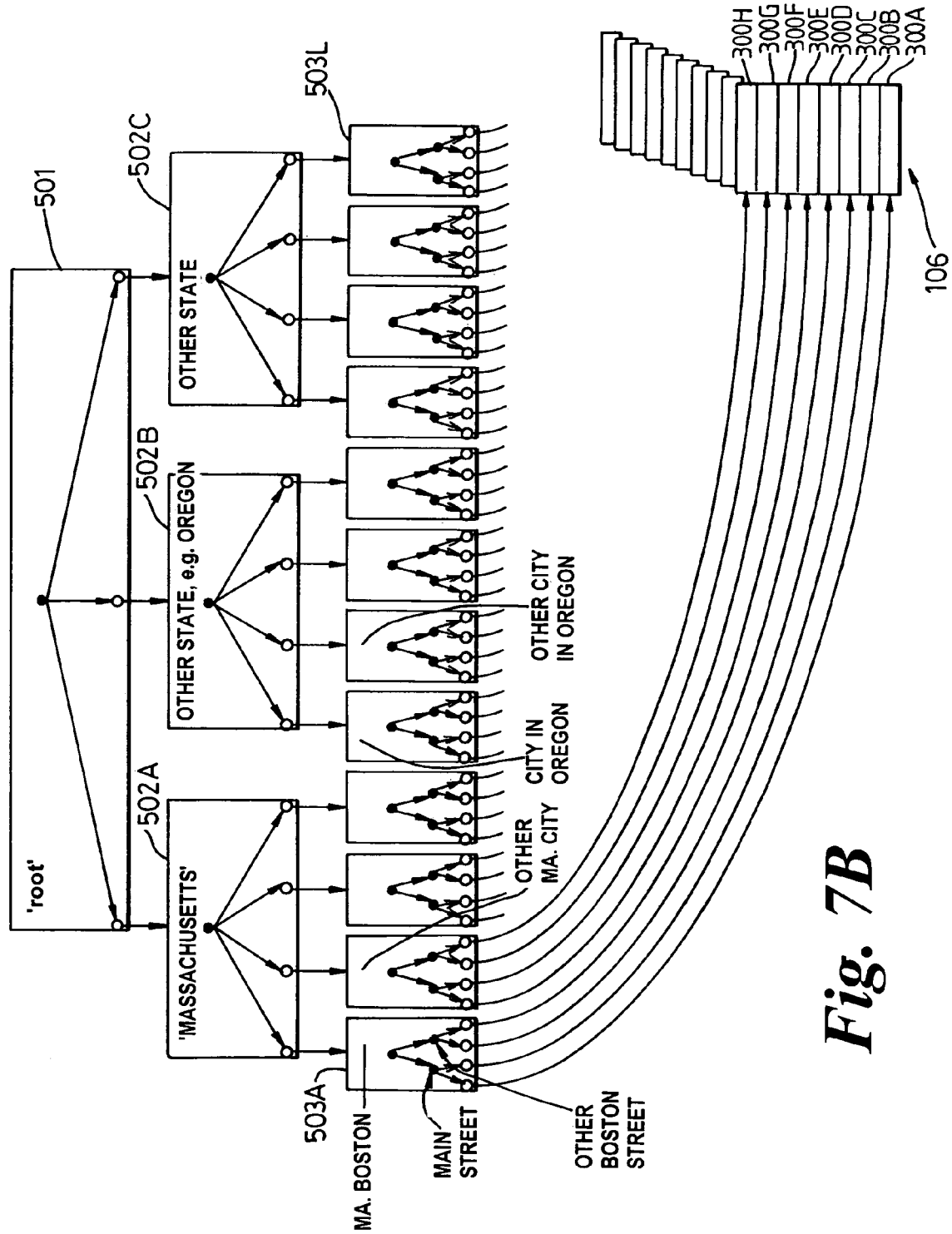

A further illustration of the partially constructed access structure following further execution of the process 202 is shown in FIG. 7B. This Figure gives an indication of how data of other records 300 in the database can be arranged in the access structure. In general, the number of node groups/nodes at a particular level in the hierarchy will depend upon the number of different data values in the field(s) corresponding to the major/minor group that defines the nodes/node groups at that level. For instance, in the small sample database used in the example, if there are three different states in the "state" field 302 (corresponding to major group 402 that defines node groups at the second level) then there will be three nodes groups 502 at the second level of the node group hierarchy. Thus, in the example, the second level node groups 502 generally contain nodes relating to different states covered by the telephone directory/book database.

The third level node group(s) 503 linked to a particular second level node group will generally contain nodes relating to different cities within the state corresponding to that second level group. The tree structures within the third level node groups contain three levels of nodes. The nodes at the second level of the tree (i.e. children of the root node) generally contain nodes relating to different streets within the city of the node group. The nodes at the third level of the tree generally contain nodes relating to different house numbers within the street of their parent node at the second level. These database field values are grouped together in nodes at the third level because they tend to be highly correlated and so matching can be conveniently performed on them together.

In use, the access structure 110 is intended to be traversed from its root level node group to one or more of the exit nodes that link to a record of the database (the nodes traversed in this way can be thought of as a "path" or "route" down the access structure). The path selected will depend upon the matching between (at least a portion) of the input and the sound tokens of the arcs between nodes/node groups. Typically, a score is computed that represents the level of matching between the input and the match pattern data (e.g. sound token) associated with each arc traversed. If the score is above a certain threshold (or is the best score computed) for a particular arc then the node/node group at the end of that arc is selected, which, in turn, leads to a selection of one or more other nodes/node groups, depending upon the score computer for the appropriate arc(s). If the selected node contains a link to a record in the database 106 then the score computed for the route of nodes/node groups traversed to lead to that particular database record will be recorded by the process, along an indication of the database record (or the data contained in the record).

Thus, node groups can be used to attempt to identify which nodes within groups should be traversed, so that only the most relevant nodes within the most relevant groups are selected for subsequent traversal. This can greatly reduce the number of comparisons/score computations based on the input and sound tokens. The higher level node groups contain a portion of the overall database and the grouping means that nodes/ data can be transferred from a storage medium that is relatively slow to access (an optical storage device or data accessed via the internet, for example) into memory that can be accessed more quickly (a hard drive or RAM, for example) when that data is required for processing by the search application. For example, entering the input "Brian Davies 100 Main Boston, Mass." into the traversal process should result in a route to the database record 300A having the best score, thereby causing the searching application to return the telephone number "853210" (from field 314 of record 300A) to the user making the request. In a USA name and address the natural order to speak the fields is the reverse of that specified above, in which case the building of the access structure and search process can be done in reverse order of the fields.

Figure 8:
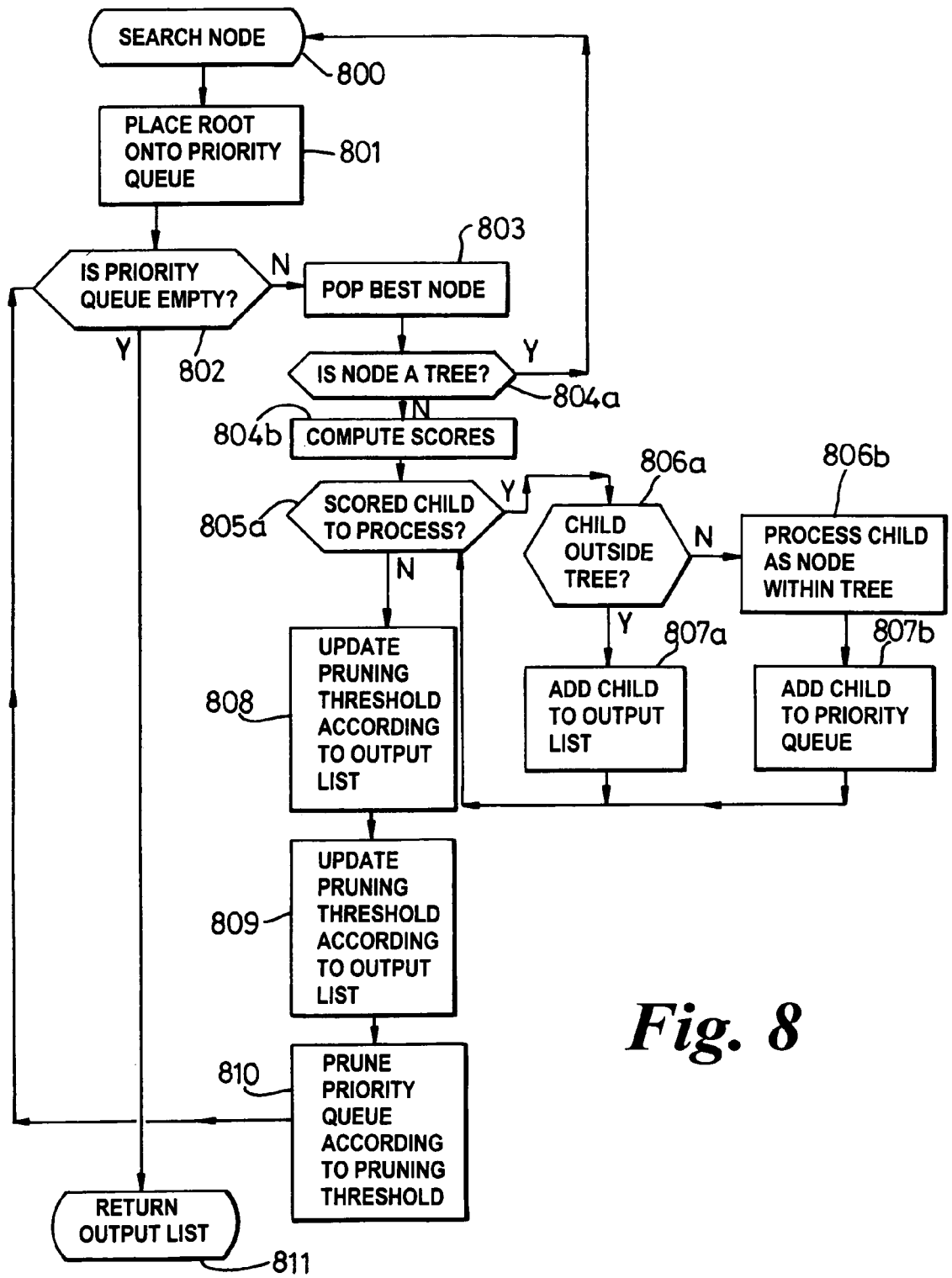
FIG. 8 illustrates schematically an example of steps involved in the process of traversing the access structure, including a step of computing a score for a node within the access structure.

FIG. 8 illustrates steps that may be involved in process 206 of FIG. 2 to traverse the access structure. The process of searching a node begins at step 800 (the input for this process will be an identifier of the node that is to be searched). At step 801 the root of the node to be searched is placed onto a queue data structure referred to as the priority queue. At step 802 a question is asked whether the priority queue is empty. If this question is answered in the negative then control passes on to step 803, where the best node from the priority queue is popped. At step 804a the type of the popped node is determined by asking whether it is a group containing nodes in a hierarchical structure (a tree). If this question is answered in the affirmative then step 800 is called using the popped node as the input so that a process of searching the popped node is invoked with that process having its own, initially-empty priority queue, pruning threshold, etc (it will be appreciated that this may be conveniently achieved using recursive programming techniques). If the question asked a step 804a is answered in the negative then control passes on to 804b, where the scores for the children of the popped node are computed. Computation of the scores may involve a partial matching technique based on a comparison between the input/search request and the match pattern data associated with arcs between the nodes being traversed, as described below.

At step 805a, a question is asked whether there is a scored child is to be processed. Step 805a defines the start of a looped procedure that effectively iterates through the scored children to be processed. The loop starts when the question asked at step 805a is answered in the affirmative and control is then passed on to step 806a, where a question is asked whether the scored child being processed is an object outside the tree containing the popped node. If this question is answered in the affirmative then control passes on to 807a, where the scored child is added to a data structure referred to as the output list and control then passes back to 805a. If the question asked at step 806a is answered in the negative then control passes on to step 806b, which indicates that the child is a node within the tree and will be processed accordingly. Control then passes on to step 807b where the scored child is added to the priority queue. Control passes back to step 805a from steps 807a and 807b.

If the question asked at step 805a is answered in the negative (effectively exiting the looped steps) then control passes on to step 808 where a variable referred to as the pruning threshold is updated according to scores contained in the priority queue. The pruning threshold can be initially defined as the best score computed so far. At step 809 the pruning threshold is further updated according to scores stored in the output list. At step 810 the priority queue is pruned against the pruning threshold and control then passes back to step 802.

If the question asked at step 802 indicates that the priority queue is empty then control passes on to step 811 where the process terminates by returning the output list of nodes and associated scores.

An example "dry run" of the process 206 using the illustrative access structure of FIG. 5 will now be given below. For brevity, some of the steps are omitted, but these will be apparent to the skilled person.

Assume the priority queue pruning parameter is initially set to 20

Assume the output list pruning parameter is initially set to 23

Step:
800. The process is called with node 500
801. The root of tree 500 (node 501) is placed on the priority queue
802. The priority queue is not empty (it contains node 501)
803. Node 501 is popped from the priority queue
804a. Node 501 is a tree/node group and so the tree is searched by recursively calling the same procedure to create a list of scored children:
   800. Search node 501
   801. Root (5011) of tree 501 is placed on the priority queue (see FIG. 9A)
   802. The priority queue is not empty (it contains node 5011 (only))
   803. Node 5011 is popped from the priority queue
   804b. Node 5011 is not a tree and so compute scores for children (5012A, 5012B, 5012C) of node 5011
   805a For scored child 502A:
      806b. Child 5012A is within tree 501
      807b. Add child 5012A to priority queue
   804. For scored child 5012B:
      806b. Child 5012B is within tree 501
      807b. Add child 5012B to priority queue
   804. For scored child 5012C:
      806b. Child 5012C is within tree 501
      807b. Add child 5012C to priority queue
   . . .
   802. The priority queue is not empty . . .
   . . .
   803. Node 5012A is popped from the priority queue
   804b. Node 5012A is not a tree and so compute score (e.g. −100) for child (502A) of node 5012A
   805. For scored child 502A:
   806a. Child 502A is outside tree 501
   807a. Add child 502A to output list
   . . .
   811. Return the output list containing nodes 502A and 502B with their scores, say, −100 and −50 respectively
805. Object 502A is examined first
806b. Object 502A is a node within the tree 500
807b. Node 502A and its score of −100 is put on the priority queue
805. Object 502B is examined next
806b. Object 502B is a node within the tree 500
807b. Node 502B and its score of −50 is put on the priority queue
808. The threshold is set according to scores in the priority queue, say, −50−20=−70
809. The output list is empty and so the threshold is not changed again
810. Node 502A is removed from the priority queue since −100<−70 (see FIG. 9B)
802. The priority queue is not empty (it now contains node 502B)

803. Node 502B is popped from the priority queue
804*a*. Node 502B is searched by recursively calling the same procedure to create a list of scored children . . .
805. Object 503B is examined first
806*b*. Object 503B is a node within the tree 500
807*b*. Node 503B and its score of −45 is put on the priority queue
805. Object 503C is examined next
806*b*. Object 503C is a node within the tree 500
807*b*. Node 503C and its score of −30 is put on the priority queue
805. Object 503D is examined next
806*b*. Object 503D is a node within the tree
807*b*. Node 503D and its score of −20 is put on the priority queue
. . .
808. The threshold is set according to scores in the priority queue, −20−20=−40
809. The output list is empty so the threshold is not changed again
810. Node 503C (and others) are removed from the priority queue since −45<−40 (see FIG. 9C)
802. The priority queue is not empty (it now contains nodes 503D and 503E)
803. Node 503E is popped from the priority queue
804*a*. Node 503E is searched by recursively calling the same procedure to create a list of scored children (database record objects 300A, 300B, 300C and 300D with their scores, say, −20, −15, −10 and −5, respectively)
805. Object 300*a* is examined first
806*a*. Object 300*a* is an object outside the tree 500
807*a*. Object 300*a* and its score of −20 is put on the output list
805. Object 300*b* is examined first
806*a*. Object 300*b* is an object outside the tree 500
807*a*. Object 300*b* and its score of −15 is put on the output list
805. Object 300*c* is examined first
806*a*. Object 300*c* is an object outside the tree 500
807*a*. Object 300*c* and its score of −10 is put on the output list
805. Object 300*d* is examined first
806*a*. Object 300*d* is an object outside the tree 500
807*a*. Object 300*d* and its score of −5 is put on the output list
808. The threshold is set according to scores in the priority queue, −30−20=−50
809. The threshold is set according to scores in the output list, −5−23=−28
810. Node 503C is removed from the priority queue since −30<−28 (see FIG. 9D)
802. The priority queue is empty
811. The output list is returned with objects 300*a*, 300*b*, 300*c* and 300*d* and their associated scores −20, −15, −10, −5.

In the example, this output list would be the result of the search/traversal process 206 as it points to entries in the database 106.

A description of an example of how scores can be computed at step 804*b* of the process of FIG. 8 will now be given. It will be understood that variations to this score computation can be made (for example, WO2004/090866 describes methods (e.g. Dynamic Programming techniques involving a confusion matrix) for a matching process that could be adapted for use in the searching application of the present specification. Other suitable methods, e.g. a full-probability calculation sometimes known as "The Forward Algorithm" or "Alpha pass", will also be known to the skilled person. In many applications, including automatic speech recognition, a "theory" (or "hypothesis") is an explanation of a sequence of input tokens, e.g. a sequence of stored sound tokens that have been matched to an input comprising (or has been divided into) a sequence of words. The scoring can be applied to both complete theories (full explanations), as well as partial theories (incomplete explanations). The scores from different theories will need to be compared and so the scores need to be computed in such a way so as to make allowance for the amount of input sequence that has been explained.

Figure 10:
FIG. 10 illustrates schematically an example of partial score computation based on an input.

FIG. 10 illustrates schematically an example of a comparison between an input sequence and tokens of a partial theory that may be performed as part of the score-computation process. The first part may be an exact score since both the explanation and the input sequence are available (producing the 'partial score'). The second part, however, cannot be an exact score since, while the input sequence is available, the explanation is missing (producing the 'estimated remaining score'). That is, the score for the partial theory is the sum of two parts: an exact score for the partial theory against the part of the input that has been matched so far and an approximate score for the unknown continuation of the partial hypothesis against the rest of the input.

A complication is that it is not clear to which piece of the input sequence the explanation given by the theory should relate because, for example, timescales (in human utterances) are variable, or because of insertions or deletions (a null input token which corresponds to part of the explanation). For a partial theory a "cache" can be computed, which is the (exact) score for the partial theory against the input at all feasible ending points. In the system described above, calculating the score for child node(s) of a particular node being processed (as described with reference to FIG. 8 above) can be thought of as calculating the cache for a partial theory against the input at all feasible ending points. The scores computed for nodes traversed in this way can be used for two purposes:

1) As a starting point for computing the equivalent sequence when the partial hypothesis is extended in some particular way (by traversing one of the arcs in the access structure), and
2) To compute the score for the partial hypothesis, by adding together an exact partial score from the above sequence and a fill-in score for the missing part.

The resulting score is used to determine the best way of dividing the input between the partial theory and the other theories computed in this way (with a score being a sum of dissimilarities between the input and match data associated with the arcs between the nodes traversed). Thus, the score for a sequence of portions of a partial theory can be computed. These partial results can be re-used by making a stack of caches, which can be stored when partial hypotheses are tested in a suitable order, such as in the hierarchical access structure. If, when computing the scores in such an order, it is found that all the scores in a cache are worse than the best complete theory found so far, then all continuations built on that cache can be abandoned (this has similarities to the known A* search technique). If a relatively small number of partial theories, e.g. only a few tens of thousands, are to be tested then this may be considered sufficient.

There are several approaches to estimating the score for the part of the input not explained by a partial theory. Here are three simple approaches to forming an estimate from the input tokens only:

1. The estimated score depends only on the number of unexplained input tokens. Each token adds a fixed amount. The value of the score for each token may be set manually by the user or may be calculated from training data as the average score per token for correct theories;

2. The estimated score again depends on the number of unexplained input tokens but the value for each is the average score in the part of the input sequence explained by the theory;
3. The estimated score depends on not only the number of unexplained input tokens but also on which tokens they are. The value is the average score for the particular input token for correct theories in some training data.

In each of the approaches above steps to deal with deletions can be carried out. For example, when calculating average scores for the other input tokens, it is possible to add the score for any deletions to the preceding input token (which one can arbitrarily think of as being associated with the deletion).

A further/alternative explanation of the system, involving another example of the database and access structure, will now be given.

Creating the Access Structure

Often the database of entries to be searched by a lexical interpreter may be organized in such a way that a tree of nodes may be created—each node containing entries that share a word-level affix (sequences of words at the beginning or end of the entry). For example, in a database of US names and addresses a tree may be created using affixes in a straightforward manner if the tree is built by reading from the end of the address back to the beginning. For example, selected portions of the database might proceed thus:

Entry
. . .
Anne Smith 1 Acacia Avenue Boston, Mass. 02112
Brian Davies 2 Acacia Avenue Boston, Mass. 02112
. . .
Irene Baker 1 Charlbury Drive Boston, Mass. 02112
. . .
James Brown 73 Main Street Cambridge, Mass. 02140
. . .
Kurt Kimble 27 Kerry Drive Worcester, Mass. 01655
. . .
Gary Baldwin 24 Kissimmee Avenue Lakeland, Fla. 33809
. . .
Harry Dupont 4427 1st Avenue Orlando, Fla. 32811
. . .

A tree with three levels may be created—a root node containing a list of States and ZIP codes, a set of non-terminal nodes (for each State) containing a list of City, State and ZIP codes, and a set of terminal nodes (for each unique combination of City, State and ZIP code) containing a list of complete database entries. Thus, the root node might proceed thus:

Entry
Alabama 35950
Alabama 35951
. . .
Connecticut 06120
Connecticut 06447
. . .
Florida 33809
Florida 32169
. . .
Massachusetts 01002
Massachusetts 01101
. . .
Rhode Island 02908
Rhode Island 02861
. . .
Wyoming 82901

Wyoming 82844

The non-terminal node for Massachusetts might proceed thus:

Entry
. . .
Acushnet, Mass. 02743
Allston, Mass. 02134
. . .
Boston, Mass. 01002
. . .
Cambridge, Mass. 02140
Centerville, Mass. 02632
. . .
Newton, Mass. 02458
. . .
Woburn, Mass. 01801
Worcester, Mass. 01655

And the terminal node for Boston might proceed thus:

Entry
Anne Smith 1 Acacia Avenue Boston, Mass. 01002
Brian Davies 2 Acacia Avenue Boston, Mass. 01002
Charlotte Brown 3 Acacia Avenue Boston, Mass. 01002
David Jones 4 Acacia Avenue Boston, Mass. 01002
Enid Green 1 Bond Street Boston, Mass. 01002
Fred Martin 2 Bond Street Boston, Mass. 01002
Georgette Smith 3 Bond Street Boston, Mass. 01002
Harry Dupont 4 Bond Street Boston, Mass. 01002
Irene Baker 1 Charlbury Drive Boston, Mass. 01002
John Flynn 2 Charlbury Drive Boston, Mass. 01002
Karen Cooper 3 Charlbury Drive Boston, Mass. 01002

Figure 11A:
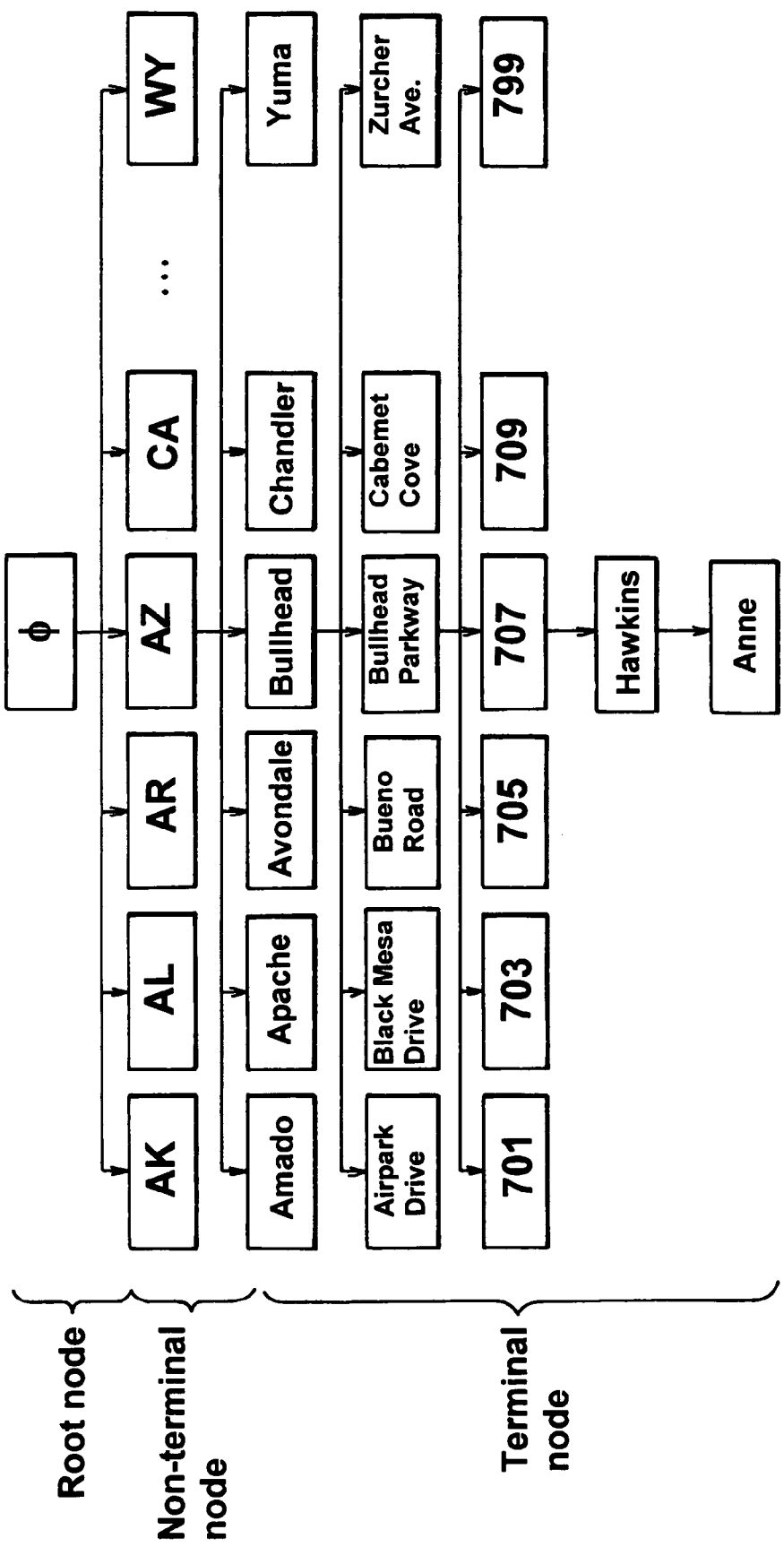
FIG. 11A illustrates a portion of another example of a database tree/access structure.

A portion of the whole database tree is shown in FIG. 11A. Which parts of the database tree are best grouped into nodes and which are stored separately as files may depend on: the size and structure of the database; the resultant size of the files; the speed of the disk access; and the size of the memory of the host computer.

Cacheing

Dynamic programming (DP) can be arranged to push hypotheses forward so as to consume extra symbols of the reference while maintaining hypotheses at all positions in the output of the phonetic recognizer. Associated with each hypothesis is a score indicating how likely the hypothesis is. Log probabilities can be used for these scores which means that, since probabilities cannot be greater than 1, these scores will be negative with values closer to zero being better.

Figure 11B:
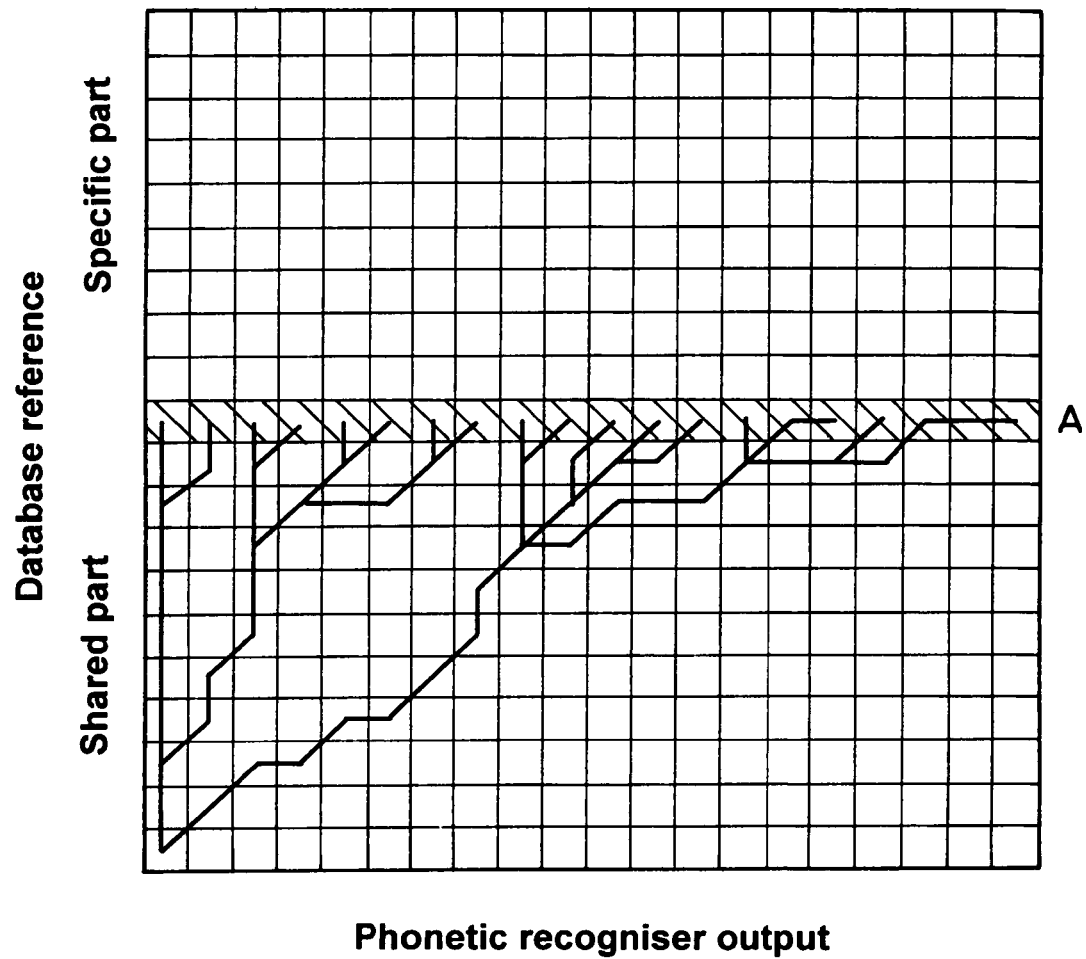
FIG. 11B is a Dynamic Programming matrix showing caching of hypotheses.

If the first part of the reference sequence is shared between entries then computation may be saved. For example, row A in FIG. 11B contains all the hypotheses which explain the shared part of the reference for any amount of the recognition sequence. It constitutes the cache, which is all that is required to extend the shared part of the reference with many specific parts.

Affix cacheing can yield two benefits. Firstly, the DP calculations for all hypothesised matches between the utterance and the affix cache will remain valid for all records sharing the affix. These hypotheses may be extended with further DP calculations once information more specific to a record is considered. Secondly, the best partial score constitutes a guaranteed optimistic bound on the partial DP score for the best complete hypothesis. By "optimistic bound" it is meant that the actual score cannot be any closer to zero.

If the database entries have been reversed during the course of tree building then the output of the phonetic recognizer must also be reversed.

Multi-level Intra-Node Cacheing

If many entries within a node share the same affix then further savings in processing may be achieved by reducing the number of DP calculations made. In the limit all records in a node may share the same affix. This is the case, for example, in the hierarchically organized name and address database in which all entries in a terminal node share at least some amount of affix. In the example given above the city, state and ZIP code will be common to all records in a terminal node. For example, in the terminal node detailed above that is associated with Boston, Mass. and ZIP code 01002 the affix Boston, Mass. 01002 is common to the whole node:

| Remaining entry | First-level affix |
|---|---|
| Anne Smith 1 Acacia Avenue | Boston Massachusetts 01002 |
| Brian Davies 2 Acacia Avenue | |
| Charlotte Brown 3 Acacia Avenue | |
| David Jones 4 Acacia Avenue | |
| Enid Green 1 Bond Street | |
| Fred Martin 2 Bond Street | |
| Georgette Smith 3 Bond Street | |
| Harry Dupont 4 Bond Street | |
| Irene Baker 1 Charlbury Drive | |
| John Flynn 2 Charlbury Drive | |
| Karen Cooper 3 Charlbury Drive | |
| . . . | |

More locally within the node there may be blocks of records that share a longer affix. In the above example street names are common to blocks of entries:

| Remaining entry | Second-level affix | First-level affix |
|---|---|---|
| Anne Smith 1 | Acacia Avenue | Boston Massachusetts 01002 |
| Brian Davies 2 | | |
| Charlotte Brown 3 | | |
| David Jones 4 | | |
| Enid Green 1 | Bond Street | |
| Fred Martin 2 | | |
| Georgette Smith 3 | | |
| Harry Dupont 4 | | |
| Irene Baker 1 | Charlbury Drive | |
| John Flynn 2 | | |
| Karen Cooper 3 | | |
| . . . | | |

Depending on the structure of the database such affix cacheing may be continued to more levels (for example last names of families living at the same address). However, cacheing of smaller and smaller blocks will be subject to the principle of diminishing returns.

Database Search

As described above, the database may be regarded as a tree with some nodes being treated as separate files and other nodes being treated as caches within a file. There is an established discipline of tree searching and many algorithms exist for this task (for example—the known depth first search, breadth first search, best first search or A* search techniques). Of these approaches A* search has a proven track record in cases where large trees need to be searched efficiently. A* search expands the tree-node that has the best combination of the partial score and the remaining score. The partial score and the remaining score may be either an estimate or a guaranteed optimistic bound. A method of providing a bound and/or estimate of the score for the remaining piece may also be required.

The estimates are primarily useful for allowing us to explore the most promising hypotheses first, whereas the bounds can be used to eliminate hypotheses entirely.

A node may be excluded from consideration (pruned) when the score associated with it is sufficiently worse than a reference score (the reference score minus a margin). This reference score may be from a node at the same level as the node being pruned or at a terminal level (i.e. a leaf node). If bounds for both the partial score and the remaining score are used and the margin is zero then the search is optimal in the sense that the best scoring entry is guaranteed to be evaluated—the algorithm is a so-called admissible algorithm. Use of estimates and margins may significantly speed up the search whilst incurring additional errors. However, if the increase in error rate is small relative to the error rate without pruning or if the error rate after pruning is considered still small enough, then this approach may be the method of choice.

Partial Score Evaluation

Figure 11C:
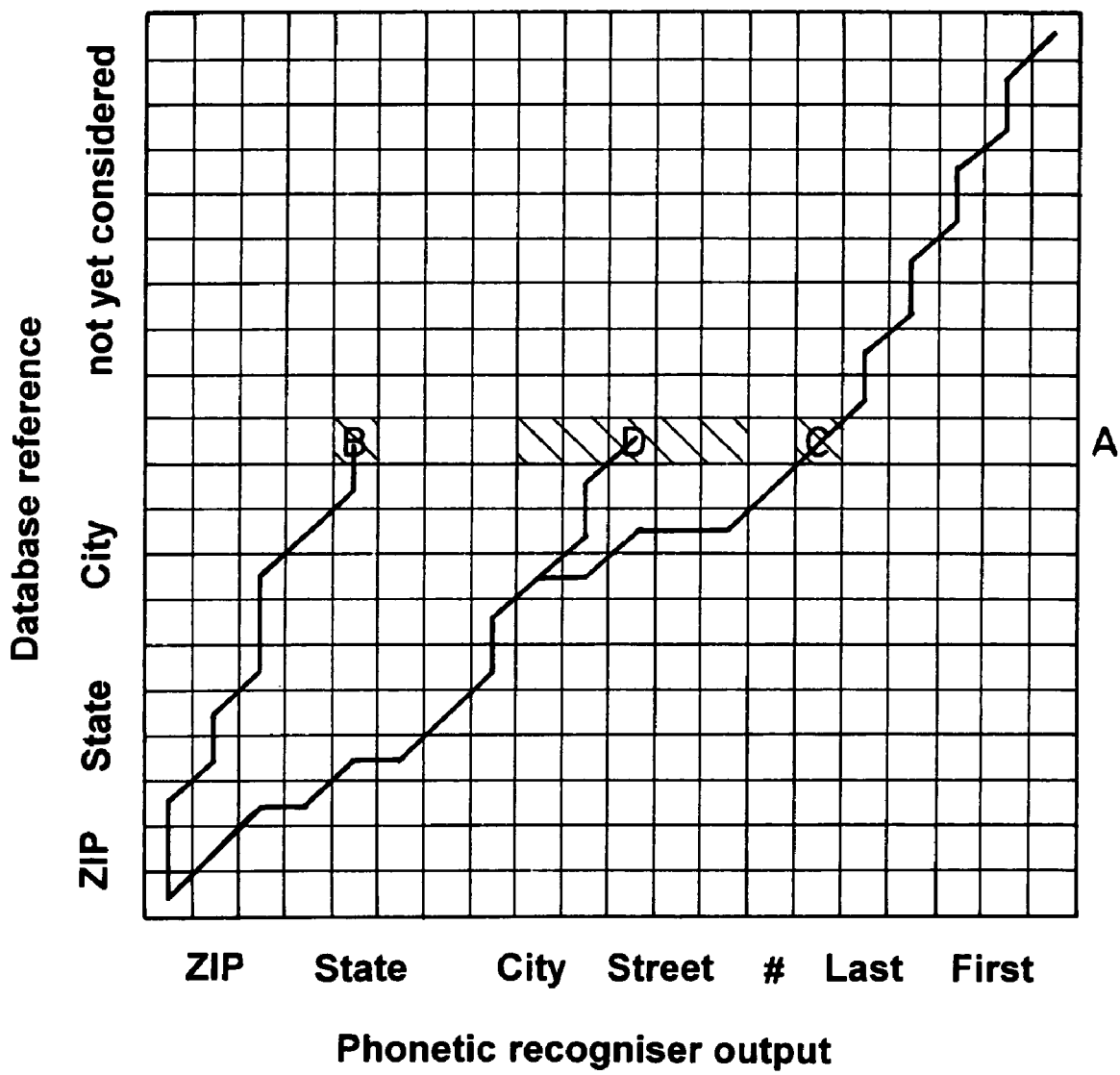
FIG. 11C is another Dynamic Programming matrix illustrating a path.

Consider a score matrix used to record the progress of some DP calculations as illustrated in FIG. 11C (a DP matrix for the alignment of a partial reference sequence against the complete output of the phonetic recogniser). Row A in the Figure contains the scores for paths matching a portion of a database record (city, state and ZIP) against the phonetic recogniser output. Suppose that cell B contains the best score in row A. This score is certainly an optimistic bound on the score for a complete match of the reference sequence against the decoder output but may be highly optimistic. Suppose cell C contains the actual cost of traversing the white region along the overall best path, this score may be much worse than either that at B or D.

A more accurate score estimate may be obtained by only examining those matches which consume a number of symbols from the phonetic recogniser which is commensurate with the length of the partial reference (cell D in the shaded interval in FIG. 11C). In this case the score is not a guaranteed bound since it is possible that the partial score of the best overall match has a better score than the one selected.

By retaining the scores for all positions in the output of the phonetic recogniser (i.e. the entirety of row A in FIG. 11C) a more sophisticated and more accurate combination of partial and remaining scores may be undertaken. In some cases the resulting score is a bound.

Estimating the Remaining Score

For any partial hypothesis corresponding to a cell (such as cell B in FIG. 11C) an estimate and/or a bound of the score for the remaining part of the recognizer output can be obtained, without needing to examine specific complete hypotheses.

One method for obtaining a score for the remaining part of the utterance is to accumulate values from the confusion matrix. For each recognition symbol remaining, the best possible score for consuming the symbol in the accumulation can be incorporated. This provides a guaranteed optimistic bound (a score which is known to be no worse than the actual score). If the expected score is used instead of the minimum, the remaining score may be more accurate but is not guaranteed to be optimistic. The expected score may be calculated by forming the sum of scores for all reference symbols versus that recognition symbol, weighted by the probability that that recognition symbol will correspond to each reference symbol. This method of determining a score for the remaining part of the output of the phonetic recognizer requires no information about the contents of the reference other than the set of symbols it may contain. This is a highly desirable property since it allows remaining score calculation before the file relating to the remaining part is opened.

What is claimed is:

1. A method of searching a database comprising a plurality of records for at least one said record that at least approximately matches a search request, wherein data values in each of the records are organized in at least one field, the method including:

creating a first tree data structure having a root node and at least one child node, each said child node being associated with match data corresponding to a data value of a field of said database record, wherein leaf child nodes of the first tree data structure include a link to another tree data structure;

creating at least one further tree data structure having a root node and at least one child node, each said child node being associated with match data corresponding to a data value of said database record, wherein leaf child nodes of the further tree data structure include a link to said database record;

traversing the first tree data structure to find at least one path between its root node and at least one of its said leaf child nodes, each said path being associated with a score reflecting a level of matching between the search request and the match data of the nodes in the path;

traversing at least one of the further tree data structures identified by the link of the leaf node of at least one said path, the traversal of the at least one further tree data structure finding at least one path between its root node and at least one of its said leaf child nodes, each said path being associated with a score reflecting a level of matching between the search request and the match data of the nodes in the path; and outputting data relating to said database record identified by the link of the leaf child node of the paths with the best scores;

wherein the traversing of said tree data structure includes a node determination process, the node determination process including:

checking the data content of a node of the tree data structure, and if the node contains data identifying another tree data structure, or group of nodes, then performing the traversal on that other tree data structure, or if the node does not contain data identifying another tree data structure then, for each child node of that node, computing a score based on a match between the search request and the match data associated with the child node.

2. A method according to claim 1, wherein the match data of said child node of the first tree data structure corresponds to said data value of said record of a first set of said database records and the match data of said child node of said further tree data structure corresponds to said data value of said record of another set of said database records.

3. A method according to claim 1, wherein the at least one child node of the first tree data structure corresponds to at least one different data value of a first common field, the first common field being a field amongst the fields of at least some of the database records having a least number of different data values and the match data of said child node of the first tree data structure corresponds to a data value of the first common field.

4. A method according to claim 1, wherein the at least one child node of said further tree data structure corresponds to at least one different data value of a further common field, said further common field being selected from amongst the fields of at least some of the database records based on a number of different data values the field contains and the match data of a said child node of said further tree data structure corresponds to data value of said further common field.

5. A method according to claim 1, wherein data related to at least some of the tree data structures created is stored on a storage medium external to the processing device performing the method and the data relating to said tree data structure is transferred to the processing device when the tree data structure is to be traversed.

6. A method according to claim 1, wherein the traversing of said tree data structure includes:

placing the root node of the tree onto a queue data structure;

popping the node from the queue data structure;

performing the node determination process on the popped node, wherein data relating to the node and the score computed for the node is placed on the queue data structure, and the scores of nodes in the queue being used to determine the selection of said further tree data structure for the traversal.

7. A method according to claim 1, wherein the computation of the score uses a Dynamic Programming technique to score a degree of matching between the search request and a hypothesis based on the match data of said path.

8. A method according to claim 7 wherein data describing said score computed for a portion of said hypothesis is stored and retrieved to avoid re-computation of the score.

9. A method according to claim 3, wherein said database record includes one or more fields, the one or more fields including data values that represent an address and contact details associated with the address.

10. A method according to claim 9, wherein the record further includes a field including a data value representing a name associated with the address and/or contact details.

11. A method according to claim 9, wherein the record includes a field including a data value representing a state and/or a ZIP/postal code.

12. A method according to claim 11, wherein the first common field includes the field representing the state or the ZIP/postal code.

13. A computing apparatus that is configured to enable searching of a database comprising a plurality of records for at least one said record that at least approximately matches a search request, wherein data values in each of the records are organized in at least one field, the computing apparatus including a memory, and a processor embodied with the memory, the computing apparatus further including:

a first tree creator for creating a first tree data structure having a root node and at least one child node, each said child node being associated with match data corresponding to a data value of a field of a database record, wherein leaf child nodes of the first tree data structure include a link to another tree data structure;

a further tree creator for creating at least one further tree data structure having a root node and at least one child node, each said child node being associated with match data corresponding to a data value of a database record, wherein leaf child nodes of the further tree data structure include a link to said database record;

a tree traversal mechanism for traversing the first tree data structure to find at least one path between its root node and at least one of its said leaf child nodes, each said path being associated with a score reflecting a level of matching between the search request and the match data of the nodes in the path;

a further tree traversal mechanism for traversing at least one of the further tree data structures identified by the link of the leaf node of at least one said path, the traversal of the at least one further tree data structure finding at least one path between its root node and at least one of its said leaf child nodes, each said path being associated with a score reflecting a level of matching between the search request and the match data of the nodes in the path, and an output generator for outputting data relating to said database record identified by the link of the leaf child node of the paths with the best scores;

wherein the traversing of said tree data structure includes a node determination process, the node determination process including:
  checking the data content of a node of the tree data structure, and
  if the node contains data identifying another tree data structure, or group of nodes, then performing the traversal on that other tree data structure, or
  if the node does not contain data identifying another tree data structure then, for each child node of that node, computing a score based on a match between the search request and the match data associated with the child node.

14. The computing apparatus of claim 13, further including an input converter for converting an input signal based on an audible signal to produce data that describes the search request.

15. The computing apparatus of claim 13, further including an output converter for converting the output data relating to the said database record into an audible signal.

16. The computing apparatus of claims 13, further including an interface for receiving an input signal over a network and/or transmitting an output over a network.

17. A computer program product comprising a computer storage medium having computer program code embodied on said storage medium for processing data, when the computer program code is executed, to make the computer perform a procedure to search a database comprising a plurality of records for at least one said record that at least approximately matches a search request, wherein data values in each of the records are organized in at least one field, wherein the procedure includes:

creating a first tree data structure having a root node and at least one child node, each said child node being associated with match data corresponding to a data value of a field of a database record, wherein leaf child nodes of the first tree data structure include a link to another tree data structure;

creating at least one further tree data structure having a root node and at least one child node, each said child node being associated with match data corresponding to a data value of a database record, wherein leaf child nodes of the further tree data structure include a link to said database record;

traversing the first tree data structure to find at least one path between its root node and at least one of its said leaf child nodes, each said path being associated with a score reflecting a level of matching between the search request and the match data of the nodes in the path;

traversing at least one of the further tree data structures identified by the link of the leaf node of at least one said path, the traversal of the at least one further tree data structure finding at least one path between its root node and at least one of its said leaf child nodes, each said path being associated with a score reflecting a level of matching between the search request and the match data of the nodes in the path, and outputting data relating to said database record identified by the link of the leaf child node of the paths with the best scores;

wherein the traversing of said tree data structure includes a node determination process, the node determination process including:
  checking the data content of a node of the tree data structure, and
  if the node contains data identifying another tree data structure, or group of nodes, then performing the traversal on that other tree data structure, or
  if the node does not contain data identifying another tree data structure then, for each child node of that node, computing a score based on a match between the search request and the match data associated with the child node.

* * * * *